United States Patent
Newell

[15] 3,671,826
[45] June 20, 1972

[54] STEPPING MOTOR DRIVER

[72] Inventor: Harold R. Newell, South Newbury, N.H.

[73] Assignee: Mesur-Matic Electronics Corp., Warner, N.H.

[22] Filed: Sept. 11, 1969

[21] Appl. No.: 857,158

[52] U.S. Cl. ............................................. 318/138, 318/696
[51] Int. Cl. ........................................................ H02k 37/00
[58] Field of Search ................... 318/138, 254, 439, 20.910, 318/20.860

[56] References Cited

UNITED STATES PATENTS

| | | | |
|---|---|---|---|
| 3,333,171 | 7/1967 | Platnick | 318/138 |
| 3,402,334 | 9/1968 | Newton | 318/138 |
| 3,486,096 | 12/1969 | Van Cleave | 318/138 |

Primary Examiner—G. R. Simmons
Attorney—Hurvitz, Rose & Greene

[57] ABSTRACT

A driver circuit for controlling the excitation of windings of a multiphase stepping motor according to a sequential switching format includes a plurality of phase activation circuits each associated with a respective one of the windings. The activation circuits are coupled together in pairs and contain active elements arranged to perform in the manner of a flip-flop in response to the switching format so that first one and then the other excites its respective winding in complementary fashion, in that when one of the windings associated with the pair of activation circuits is on, the other is off, and vice versa. An electrical energy storage device is associated with and coupled to each pair of activation circuits for storing energy from the power supply and from the collapsing magnetic field of the de-energized winding, and for supplying the stored energy to the windings in the proper sequence during predetermined portions of the switching format, thereby raising the average current to the windings and the torque on the shaft.

6 Claims, 2 Drawing Figures

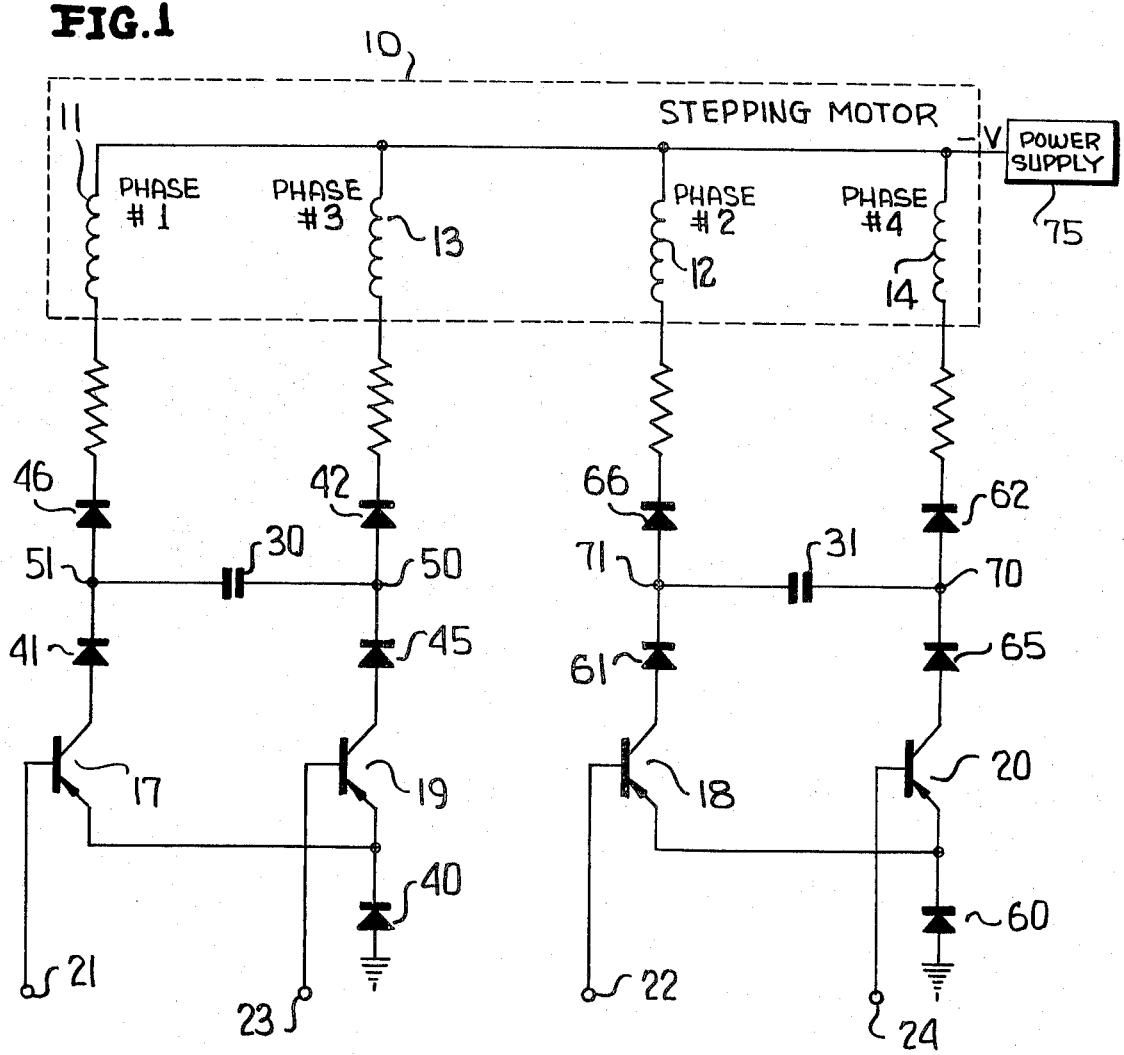
INVENTOR
HAROLD R. NEWELL
BY Hurwitz, Rose & Green
ATTORNEYS

STEPPING MOTOR DRIVER

BACKGROUND OF THE INVENTION

The present invention relates generally to control circuits and more particularly, to drive circuits for multiphase stepping motors.

In general, multiphase stepping motors are operated or driven by sequentially switching a d-c supply voltage to the several windings for equal increments of time. For example, a four-phase stepping motor having successive field windings A, B, C, and D arranged relative to each other and to the rotor such as to produce upon energization, a magnetic field tending to exert a torque on the shaft coupled to the rotor, would normally be stepped through discrete equiangular shaft orientations by selectively applying a driving voltage to the windings (coils) A, B, C, D, A, B, C, D, etc. for equal intervals of time. Certain improvements in the stepping motor operation, and specifically an increase in torque, may be obtained by a variation of the sequential energization of windings, namely, application of the energizing voltage to two windings at a time in the equal time interval sequence, such as by exciting the windings according to the format A+B, B+C, C+D, D+A, A+B, etc.

An increase in switching speed to produce higher incremental rotational velocities of the shaft, that is, high speed stepping, however, is characterized by a reduction in coil current and consequently a reduction in the torque-producing magnetic field, because of the motor coil inductance. As is well-known, current through an inductive element cannot undergo an instantaneous (non-continuous) change in magnitude except by supplying the inductor with discrete "packages" of current in the form of impulses of substantially infinitesimal width (i.e., impulse widths approaching zero). It is possible to assure sufficient current for high switching speeds by selectively increasing the supply voltage, but this method is impractical, although certainly readily achievable, because it requires advance knowledge of exact times that high stepping speeds will be required, information which is not generally foreseeable or available a priori, and because it leads to excessive winding currents, as a consequence of the increased supply voltage, when motor operation is ceased.

Another method of providing sufficient current for the desired high switching speed is implemented by use of a dropping resistor and capacitor in parallel circuit through which an increased supply voltage is applied to the windings. The capacitor serves to ensure rapid build-up of current through the coils during switching and the dropping resistor functions to reduce winding currents during periods when the motor is stopped. It is apparent that this method, like that mentioned immediately above, requires an abnormally high power supply voltage. Moreover, in the former case the voltage must be varied according to the desired motor speed, while in the latter case a significant amount of power is dissipated in the dropping resistor.

In my application for U.S. Pat., Ser. No. 581,334, filed Sept. 22, 1966, entitled "Multi-Phase Step Motor Control Circuits," now U.S. Pat. No. 3,444,447, I have disclosed multiphase driver circuitry wherein a plurality of switching circuits, corresponding in number to the number of stepping phases to which the motor is to be subjected, are sequentially activated according to a predetermined switching logic program. The field windings of the motor are excited according to the energization of the driver switching circuits with which they are associated so that each step phase has "on" periods, i.e., time intervals during which the field winding corresponding to that phase is excited, and "off" periods, i.e., intervals during which there is no excitation of the corresponding field winding. Each switching circuit is arranged and adapted to store energy from the overall circuit power supply during the "off" periods of its associated phase and to supply the stored energy along with the normally available energy from the circuit power supply to the field winding for that phase during its predetermined "on" period, so as to compensate for the finite current rise time owing to the inductance of the winding. In other words, where high switching speeds are desired the driver provides a torque "boost" to the motor by increasing the speed at which the torque-producing magnetic field of each winding builds up, and this is accomplished without the necessity of increasing the output of the power supply. On the other hand, for low switching speed operation the average increase in the amount of energy supplied to the windings is practically negligible, so that, in overall effect, the driver circuit automatically adjusts motor driving torque throughout any variations in switching speed which may be necessary or desirable for the stepping motor operation.

In the prior art, the stored energy, which is released when the field around the winding decays, is lost in the voltage limiting means used to prevent damage to the switching transistors. At high stepping rates, this lost energy alone can be equal to or even greater than the energy required to run the motor at low rates.

While the invention disclosed in my aforementioned co-pending application performs admirably in carrying out its intended purpose, I have found that certain improvements in operation may be obtained by storing in an energy storage device not only some of the energy that may be obtained from the system power supply, but by additionally storing energy from each winding that was previously turned "off," that is to say, storing energy from the collapsing magnetic field that occurs when current to a winding is terminated.

Accordingly, it is a broad object of the present invention to provide a stepping motor driver which overcomes the normal impediment to rapid rise of current in a motor winding that is newly turned on, so that during rapid switching of current to the field winding required during high speed stepped shaft rotation, the average current to the motor, and thus the shaft torque, is maintained at a relatively high level.

SUMMARY OF THE INVENTION

Briefly, according to the present invention, a single energy storage device is associated with each pair of field windings or phases of the motor, that is, the number of such devices is equal to the number of pairs of windings, and is so arranged in the driver circuit that it responds to the activation of one of the associated phases to store energy from the power source for the driver, and upon activation of the other associated phase, to supply the stored energy to the first phase causing a momentary increase in the current in the winding constituting that phase. The effect over a number of steps is to increase the average current to the motor, and accordingly, the torque on the shaft.

Moreover, as the magnetic field of the first phase collapses following the momentary current increase in its winding (at that point, the first phase has been deactivated in so far as that can be accomplished by the absence of a respective one of the external energizing pulses supplied to the motor driver), in response to the continued release of the stored energy from the storage device, the storage device is now supplied with energy from the decaying field which may amount to several times the energy supplied by the power source for the driver. As the second phase is deactivated and the first phase re-activated by the absence or presence, respectively, of external energizing pulses to the motor driver in accordance with the switching logic, the energy now present in the storage device is released to significantly increase the level of current in the second phase winding. This too has the effect of raising the average current to the motor windings, and thereby, increasing the available torque.

The process is repetitive, taking power that would otherwise be largely dissipated in the form of heat, or would be retained by the power supply and unavailable at specific portions of the phase switching cycle, for use in subsequently supplying higher energy levels to the various phases at specific portions of the switching cycle.

BRIEF DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings in which:

FIG. 1 is a circuit diagram of a four-phase stepping motor driver according to my invention; and FIG. 2 is a tabulation exemplifying the switching logic for the motor driver of FIG. 1.

DESCRIPTION OF THE PREFERRED EMBODIMENT

Referring now to FIG. 1, the several windings of a multiphase stepping motor schematically represented by the dotted block designated 10, are connected to respective phase activation circuits or switching circuits of a motor driver circuit. The stepping motor may be of any well-known type such as that manufactured by the United Shoe Machinery Corporation as their HDUM series (e.g., HDUM-30-7), marketed under the trade name "Responsyn," or the Superior Electric Company "SLO SYN" bifilar stepping motor. The motor represented in FIG. 1 has four phases with respective windings designated 11, 12, 13, and 14.

Each of the phase activation circuits of the overall driver circuit for the motor includes a transistor 17, 18, 19, 20, respectively. The collector of each transistor is coupled via series connected diodes, such as 41, 46 in the case of transistor 17, poled anode to cathode in the direction of the respective winding of the motor phase to be activated by that particular circuit. The several phase activating circuits of the overall motor driver circuit are connected in pairs and are so energized that each pair of transistors effectively operates as a flip-flop. Specifically, the activating circuits for phases 1 and 3 form one pair and the activating circuits for phases 2 and 4 form the second pair. As will become apparent from the ensuing description, the windings associated with the respective phases are excited in such a manner that they form complementary pairs in which one phase is "on" when the other is "off," and vice versa. If more phases were available in a specific motor configuration, then an appropriately greater number of activating circuits would of course be utilized. In the activating circuits for phases 1 and 3, the emitter electrodes of transistors 17 and 19 are connected together and to the cathode of a diode 40 whose anode is grounded or connected to some other point of reference potential. Energizing pulses for the various activation circuits by which to provide the desired switching logic for the various motor phases are supplied to terminals such as 21, 23 connected to the base electrodes of the respective transistors 17, 19.

The junctions between the diodes by which the transistors in each respective pair of activation circuits are connected to the respective phase windings are themselves connected by a capacitor, such as 30 for transistors 17, 19, which capacitor is to be utilized as the energy storage device in the preferred embodiment. The same general arrangement and interconnection of components occurs in the activation circuit pairs for the other pairs of phases and hence the description of one such pair is sufficient. Power is supplied to the motor driver circuit by a power supply 75 connected in common to the other end of each of the windings of motor 10. The power supply provides a negative voltage (for example, minus 75 volts) by which to energize the various phases in accordance with the switching logic and to provide necessary biasing for the transistors. The polarity of the power supply depends of course upon the types of components used and would obviously be required to provide a positive voltage output if NPN transistors were used in place of the PNP-type shown. In the latter case, the directions in which the diodes are poled would also be reversed from those shown.

In operation, each pair of phase activation circuits is normally energized to operate similarly to a flip-flop, in the sense that an energizing pulse of appropriate polarity is first applied to terminal 21, and after some predetermined time interval a second energizing pulse of appropriate polarity is applied to terminal 23 simultaneously with the removal of the energizing pulse from terminal 21, and so forth. If, for example, transistor 17 is driven from its normal cut-off state to a state of saturation, or more generally, from a non-conductive to a conductive condition, then diodes 40, 41, and 46 are forward biased as a result of the voltage levels existing through that portion of the circuit and phase 1 is activated by the current flow through winding 11. At the same time, phase 3 is momentarily activated as a result of the transient current flow through winding 13 via the forward biased diodes 40, 41 and 42, and capacitor 30. Except for the instant at which transistor 17 is turned on, however, the energization current level in winding 13 is far less than that in winding 11 and approaches zero as capacitor 30 charges to the level of voltage available from power supply 75. Accordingly, the effect of this very fleeting activation of phase 3 that results in the charging of capacitor 30 from the power supply, is otherwise practically negligible in the motor operation.

When transistor 19 is turned on and transistor 17 is turned off, point 50 is driven, disregarding some inconsequential voltage drops across the diodes and the transistor, to the level of the reference potential at the anode of diode 40. Since capacitor 30 is charged to approximately the level of power supply 75, it follows that point 51 on the other side of the capacitor assumes a voltage level equal to approximately the power supply level above ground, the reference level at point 50. At this moment, then, the voltage difference between the two ends of winding 11 is equal to approximately twice the output voltage of power supply 75, and there is accordingly a momentary increase in the current through winding 11 (phase number 1) of the stepping motor. In effect, that phase is supplied with an impulse of current, as capacitor 30 undergoes a relatively rapid discharge, at the very instant that winding 11 would otherwise be deactivated as a result of the turning off of transistor 17. Taken over a large number of steps, this operation, which occurs during a portion of each switching cycle, results in a substantial increase in the average current supplied to the motor windings, and is particularly effective during high speed switching to increase the shaft torque over what it would ordinarily be in the absence of an addition to average current level.

In the prior art, the stored energy, which is released when the field around the winding decays, is lost in the voltage limiting means used to prevent damage to the switching transistors. At high stepping rates, this lost energy alone can be equal to or even greater than the energy required to run the motor at low rates.

Following this momentary increase of current through winding 11, the magnetic field associated with phase number 1 immediately begins to decay with the discharge of capacitor 30. The collapsing magnetic field produces a reverse voltage surge or spike that drives point 51 to a potential level of up to approximately three times the output level of power supply 75. This voltage is retained by capacitor 30 because diode 46 decouples winding 11 from capacitor 30 when the magnetic field associated with that phase has collapsed. That is to say, the cathode of diode 46 is now at the level of power supply 75 while the anode of the diode is at a voltage level significantly more negative than the level of supply 75.

When, during the next appropriate interval, transistor 19 is turned off and simultaneously therewith transistor 17 is turned back on, point 51 is driven to approximately ground level, disregarding the negligible voltage drops across diodes 40 and 41 and transistor 17, point 50 is driven to a positive level equal to the negative supply voltage plus the voltage supplied by the capacitor 30 in terms of its stored energy due to the decay spike. This obviously greatly increases the current flow through winding 13 associated with phase number 3, which feels the effect of not only the power supply level, but the voltage stored by capacitor 30. Here again, a package or impulse of current is momentarily supplied to a phase winding at the very moment when it would otherwise be deactivated as a result of removal of the energizing pulse at its respective activation circuit. That is to say, the momentary increase in current flow through winding 13 occurs at a time when transistor 19 is turned off and transistor 17, which activates phase number 1, is turned on.

The operation which has thus far been described is repetitive, and it will be observed that the activation circuit and energy storage device arrangement advantageously stores energy from the circuit power supply during intervals when one of the associated phase is turned "on" and supplies that energy to that same phase at the moment when it would otherwise be turned "off"; and that the storage device further receives and retains energy from the decaying magnetic field of that phase to supply the stored energy to the other associated phase when the latter phase would otherwise be turned "off." Each actively coupled pair of activation circuits performs in this manner, being energized in a flip-flop manner according to signals supplied to input terminals 21, 23 and 22, 24.

Switches 17, 18, 19 and 20 are preferably transistors, and in that event must be utilized with diodes in the manner shown in FIG. 1. Diodes 42 and 46, for example, are necessary to prevent the loop including windings 11 and 13 of the motor and capacitor 30 from undergoing oscillation in general, and damped oscillation in particular, each time the capacitor receives a charge. Without these two diodes, then, the voltage level available on the capacitor would be insufficient to ensure the commutation by which the stored energy is supplied to the appropriate windings. Diodes 41 and 45 are utilized to protect their respective transistors against damage upon the occurrence of a voltage reversal (e.g., reverse voltage spike) in the motor windings. Diode 40 serves to provide the proper bias for the transistor which is cut off. That is, the current flow through diode 40, when transistor 17 is turned on, for example, produces a voltage level at the cathode of that diode for appropriately biasing transistor 19 back to its cut-off state.

Each of the capacitors, such as 30, is also important in limiting the voltage level to which the collector of the "off" transistor can be driven by the collapsing field of the winding, to prevent breakdown of that transistor. In addition, each capacitor ensures that the voltage rises slowly, thereby providing sufficient time for the transistors to turn completely off before extremely high voltage levels are applied.

Referring now to FIG. 2, an exemplary switching logic diagram for the driver circuit of FIG. 1, the energizing pulses are applied to terminals 21–24 in a sequence to provide energization of two windings at a time during any given time interval. For example, during time interval number 1, phases 1 and 2 are turned on by applying energizing pulses to terminals 21 and 22. At the conclusion of time interval number 1, energizing pulses are applied to input terminals 22 and 23 to activate phases 2 and 3. This phase activation continues in the manner shown in the table of FIG. 2, in the direction of increasing time interval for the arbitrarily selected forward direction of shaft rotation, and in the decreasing direction of time interval for the opposite or reverse direction of shaft rotation.

It will be observed that for this exemplary energization of two windings at any given interval of time, one winding remains on during two successive time intervals. For example, phase 2 is on during time intervals 1 and 2 for the switching logic diagram of FIG. 2. In such a case, the energizing voltage is maintained uniformly at terminal 22 throughout intervals 1 and 2 and a complete cycle of the flip-flop action (of transistors 18 and 20, for example) requires a period of four timing intervals of the switching logic.

I claim:

1. Control circuitry for exciting the field windings of a multiphase stepping motor, comprising
a driver circuit for supplying energizing currents to said field windings in a predetermined sequential switching format, so that each field winding is energized during certain preselected time increments of said switching format and de-energized during certain other preselected time increments of said switching format;
a power supply for said driver circuit;
said driver circuit including
a plurality of switching circuits corresponding in number to the number of stepping phases of said motor, said switching circuits coupled in pairs to respective pairs of said field windings constituting respective phases of said motor and each of said switching circuits including in series one of said windings, two series connected diodes and a phasing switch, all in the order recited,
and means associated with each respective pair of switching circuits for storing energy from said power supply during energization of one of the associated field windings and for supplying the stored energy in the form of additional energizing current to said one associated field winding at the conclusion of its normal energization interval, and for storing energy from the collapsing magnetic field of said one associated field winding upon de-energization thereof and for supplying the last-named stored energy in the form of additional energizing current to the other associated field windings at the conclusion of its normal energization interval, said storing and supplying means comprising a capacitor interconnecting each pair of said switching circuits, and wherein each of said switching circuits includes one of said phasing switches responsive to said switching format to open and close circuits containing respective field windings through said capacitor to produce said storing and supplying operations during said intervals.

2. Control circuitry for exciting the field windings of a multiphase stepping motor, comprising
a driver circuit for supplying energizing currents to said field windings in a predetermined sequential switching format, so that each field winding is energized during certain preselected time increments of said switching format and de-energized during certain other preselected time increments of said switching format;
a power supply for said driver circuit;
said driver circuit including
a plurality of switching circuits corresponding in number to the number of stepping phases of said motor, said switching circuits coupled in pairs to respective pairs of said field windings constituting respective phases of said motor,
and means associated with each respective pair of switching circuits for storing energy from said power supply during energization of one of the associated field windings and for supplying the stored energy in the form of additional energizing current to said one associated field winding at the conclusion of its normal energization interval, and for storing energy from the collapsing magnetic field of said one associated field winding upon de-enerization thereof and for supplying the last-named stored energy in the form of additional energizing current to the other associated field windings at the conclusion of its normal energization interval,
said means for storing and supplying comprising a capacitor interconnecting each pair of said switching circuits, and wherein each of said switching circuits includes switch means responsive to said switching format to open and close circuits containing the respective field windings through said capacitor to produce said storing and supplying operations during said intervals,
and switch means comprising a transistor for each switching circuit, and wherein is further provided in each switching circuit first diode means for protecting said transistor from reverse voltage surges in said windings and second diode means to prevent oscillation of a completed circuit containing said capacitor and associated field windings.

3. The invention according to claim 2 wherein the controllable current path of said transistor is connected in series circuit with said first diode means, said second diode means, the respective field winding, and said power supply in each switching circuit; and wherein said capacitor is connected from the junction of said first and said second diode means in one switching circuit to the junction of said first and said second diode means in the other switching circuit for a respective pair of said switching circuits; and wherein the end of the controllable current path of the transistor opposite that to which said first diode means is connected is coupled to the corresponding end of the transistor in the other switching circuit of that pair and to a point of reference potential.

4. Apparatus for controlling the excitation of windings of a multiphase stepping motor for equal intervals of time according to a predetermined sequential excitation format, said format characterized by the excitation of certain windings during intervals in which certain other windings are unexcited and vice versa, so that the windings form complementary pairs; said apparatus comprising a plurality of non-inducive phase activation circuits, each associated with a respective one of said windings;

a d-c power supply coupled to all of said activation circuits;

said activation circuits coupled together in pairs and each containing in series one of said windings, two series connected diodes and a phasing switch all in the order recited, said phasing switches including active transistor elements arranged to undergo flip-flop operation in response to said excitation format, so that first the activation circuit associated with one winding and then the activation circuit associated with the other winding of a complementary pair supply energizing current to the respective winding from said d-c power supply; and one electrical energy storage means connected between each pair of activation circuits for storing electrical energy from said power supply and from the collapsing magnetic field of the de-energized winding during portions of the excitation format and for supplying stored energy to the windings in the proper sequence during other portions of the excitation format to increase the average current to said windings over a substantial number of steps of the stepping motor relative to the value of average current to said windings in the absence of energy storage.

5. A driver circuit for the windings of a step motor having a plurality of complementary stepping phases, comprising a separate transistor switching circuit for each phase, connected to the respective winding associated with that phase, and each said transistor switching circuit including a transistor phasing switch and two diodes connected in series between said respective winding and said phasing switch, each said switching circuit effective, when energized, to excite said respective winding for a predetermined interval of time, one separate capacitive electrical energy storing means connected between each pair of switching circuits connected to a pair of complementary windings, and means connecting the switching circuits associated with a pair of complementary windings together via the respective electrical energy storing means associated with those switching circuits such that upon energization in alternation of each said pair of switching circuits, the electrical energy storing means connected thereto stores energy from the collapsing magnetic field of the winding whose excitation has been removed and supplies the stored energy to the complementary winding in or contiguous with its next interval of excitation.

6. In a multi-phase step motor having windings of phases 1 to n, where n is an even number, means for energizing said phases always simultaneously in adjacent pairs and sequentially selecting the pairs timewise to accomplish a complete sequential scan of all the phases while only maintaining adjacent pairs energized, a terminal connected between a voltage source and a reference point, parallel circuits extending between said terminal and said reference point, each of said parallel circuits including in series one of said windings, two series connected diodes poled to be conductive of current between said terminal and said reference point, and a phasing switch, all in the order recited, and a separate storage capacitor connected between the junctions of the series connected diodes of all pairs of said windings numbered by numbers separated by unity.

* * * * *